United States Patent [19]
Peot

[11] Patent Number: 5,757,154
[45] Date of Patent: May 26, 1998

[54] ELECTRIC MOTOR BRAKING CIRCUIT ARRANGEMENT

[75] Inventor: David George Peot, Easley, S.C.

[73] Assignee: Ryobi Motor Products Corp., Pickens, S.C.

[21] Appl. No.: 578,617

[22] PCT Filed: Jul. 9, 1993

[86] PCT No.: PCT/US93/06492

§ 371 Date: Jan. 11, 1996

§ 102(e) Date: Jan. 11, 1996

[87] PCT Pub. No.: WO95/02276

PCT Pub. Date: Jan. 19, 1995

[51] Int. Cl.$^6$ .................................. H02D 3/00
[52] U.S. Cl. ............... 318/381; 318/113; 318/248; 318/245
[58] Field of Search ................. 318/362, 375, 318/376, 377, 759, 760, 113, 379–382, 761–765, 244–252

[56] References Cited

U.S. PATENT DOCUMENTS

| | | | |
|---|---|---|---|
| 3,593,085 | 7/1971 | Decker | 318/382 X |
| 4,096,423 | 6/1978 | Bailey et al. | 318/376 X |
| 4,217,532 | 8/1980 | Alfieri et al. | 318/759 |
| 4,794,273 | 12/1988 | McCullough et al. | 361/189 |
| 5,517,093 | 5/1996 | Augustyniak et al. | 318/380 X |

*Primary Examiner*—Jonathan Wysocki
*Attorney, Agent, or Firm*—Brooks & Kushman P.C.

[57] ABSTRACT

A motor braking circuit arrangement, for use with a series/universal motor and a power supply for supplying power to the motor, including two separately actuable switches electrically interconnecting a separate braking winding with the motor to effect braking when either of the two switches are deactuated. The circuit arrangement includes a field winding wound about the motor stator and electrically connected in series with the motor armature winding. The separate brake winding is wound about the stator. The two switches are series-connected, and each switch is capable of assuming a first position associated with normal motor operation and a second position associated with motor braking wherein the separate brake winding is electrically connected in parallel with the motor armature. The switches may be single-pole, double-pole or combinations thereof. The separate brake winding may be series-connected with a resistor to limit the current flow through the brake winding, thereby limiting the rate of motor braking.

7 Claims, 4 Drawing Sheets

ELECTRIC MOTOR BRAKING CIRCUIT ARRANGEMENT

TECHNICAL FIELD

The present invention relates to braking a series/Universal motor having a field winding for normal operation and a separate field winding for braking in addition to the armature winding.

BACKGROUND ART

Regulations pertaining to certain motor-operated implements such as hedge trimmers, which require two handed operation are changing to require a structure that will assist in braking of the motor. More specifically, these regulations require that both gripping surfaces contain a switch which must be actuated to operate the implement. These switches are interconnected such that releasing the grip on either handle disconnects the motor from the power supply circuit.

Additionally, the regulations typically specify a maximum stopping time—the time it takes the blades or cutting devices to stop after one of the grips is released. This maximum stopping time is usually less than the normal coasting time of the motor and drive mechanism. These regulations seek to prevent undesirable contact of the hand with the blade. Additionally, the regulations seek to prevent the cutting of power supply cords, and other objects not meant to be cut, when the hedge trimmer is set down with the blade still coasting.

Today, there are commercially available products that comply with this requirement. In these products, there are three general methods of compliance. In the first method, two switch braking is accomplished by interrupting the power supply circuit with a switch in each handle and activating a mechanical braking mechanism, such as a hand brake. Another method is to use an electrical dynamic brake on one switch and a mechanical braking mechanism activated by the other switch. The third method utilizes two switches with electrical braking in conjunction with a permanent magnet motor.

SUMMARY OF THE INVENTION

It is an object of the present invention to provide improved braking in a motor-operated implement having two switches for operating the motor such that when either of the two switches are released, the cutting blade will stop quickly.

In a preferred construction, the hedge trimmer would have one switch located in each handle, thereby insuring that both hands are properly positioned on the normal gripping surfaces before the unit can be operated. Releasing the hand from either handle would disconnect the power supply from the motor and activate the braking action. The switches could be single-pole, double-pole or a combination of both. More specifically, during normal operation, actuation of both switches is required to provide power to the main field coil which is connected in series with the armature winding. Deactuating either switch disconnects the motor from the power supply and connects the braking coil across the armature winding, thereby braking the motor.

In carrying out the above object and other objects and features of the present invention, there is provided a motor braking circuit arrangement, for use with a series/universal motor and a power supply for supplying power to the motor, the motor having a stator and an armature for rotating relative to the stator. The circuit arrangement comprises a field winding wound about the stator, the field winding electrically connected in series with an armature winding wound about the armature. The circuit also comprises a separate brake winding wound about the stator, and two series-connected single-pole switches, each switch being capable of assuming a first position associated with normal motor operation and a second position associated with motor braking. The switches are electrically interconnected with the power supply, the armature and the brake winding such that the motor is energized by the power supply when both switches are in said first position, and such that when either of the switches is in the second position, the motor is disconnected from the power supply and the brake winding is electrically connected in parallel with the armature so as to effect motor braking.

In alternative embodiments, the switches are double-pole switches, and a combination of single-pole and double-pole switches. A current limiting resistor may be electrically connected in series with the separate brake winding to limit the rate of motor braking.

The above object and other objects, features, and advantages of the present invention will be readily appreciated from the following detailed description of the best mode for carrying out the invention when taken in connection with the accompanying drawings.

BEST MODE FOR CARRYING OUT THE INVENTION

Figure 1:
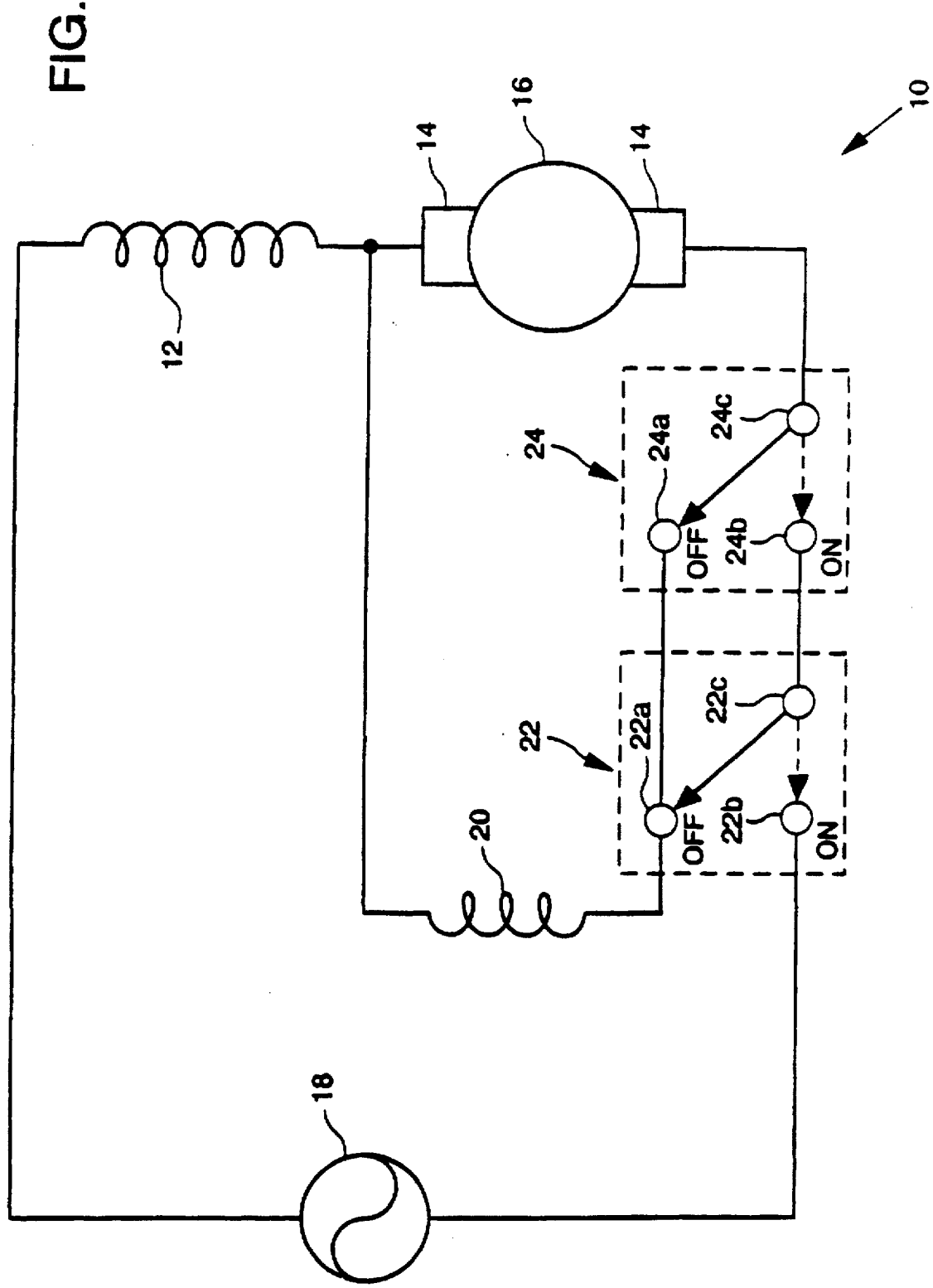
FIG. 1 is a schematic of a first embodiment of the present invention including a series motor with a brake winding and two single-pole, double-throw switches connected to a power source.

Referring now to FIG. 1, there is shown a circuit schematic of the first preferred embodiment of the present invention. As shown, this embodiment includes a dynamo-electric machine consisting of a series motor 10 having a field winding 12, electrical brushes 14 and an armature 16, connected to an AC or DC power supply 18. As shown, the motor 10 also includes a separate brake winding 20 preferably in parallel with the brushes 14 and armature 16. In the preferred embodiment, the separate brake winding 20 is wound in the same direction as the field winding 12, but so that the current flow therethrough is opposite that of the field winding. This type of electrical connection is obtained through the use of single-pole, double-throw (SPDT) switches 22 and 24. The arrangement of motor 10, power supply 18, brake winding 20 and switches 22 and 24 shown is particularly useful in certain motor-operated implements, such as hedge trimmers and the like, which require two-handed operation. In these types of motor-operated implements, the motor 10 drives for example cutting blades.

and it may be desirable to quickly stop the motor when the trimmer is released by either hand so as to stop the cutting action of the blades.

In the preferred embodiment, the switches 22 and 24 are disposed within the handle(s) of the hedge trimmer in the area that is gripped by the operator, such that when the operator has both hands on the handle grips, both of the switches would be in the ON position. The switches 22 and 24 are electrically interconnected such that when either of the switches are in the OFF position, as shown in FIG. 1, the brake winding 20 is in parallel with the brushes 14 and armature 16.

To achieve this function, the OFF contact 22a of switch 22 is tied to one end of the brake winding 20 and the OFF contact 24a of switch 24, whereas the ON contact 22b of switch 22 is tied to the power supply 18. As shown in FIG. 1, the COMMON contact 22c of switch 22 is tied to the ON contact 24b of switch 24. The COMMON contact of switch 24 is tied to one of the brushes 14.

In operation, when both switches 22 and 24 are in the OFF position (i.e. both of the operator's hands are off of the handle grip), the power supply 18 is disconnected from the motor circuit including the field coil 12, the brushes 14 and the armature 16 and the brake winding 20 is connected in parallel with the brushes and the armature. If one of the switches 22 or 24 is then actuated to the ON position (shown in phantom in FIG. 1), the motor circuit remains disconnected from the power supply 18 and, therefore, the brake winding 20 remains connected across the brushes and the armature. However, when both switches 22 and 24 are actuated to the ON position, the power supply 18 is connected to the motor circuit, energizing the motor 10.

The brake winding 20 is disconnected from the circuit as long as the motor 10 remains energized (i.e. both switches are in the ON position). If during operation, either handle grip is released, the power supply 18 will immediately be disconnected and the brake winding 20 connected across the brushes 14 and the armature 16. This results in a braking action, quickly stopping the motor 10.

Figure 2:
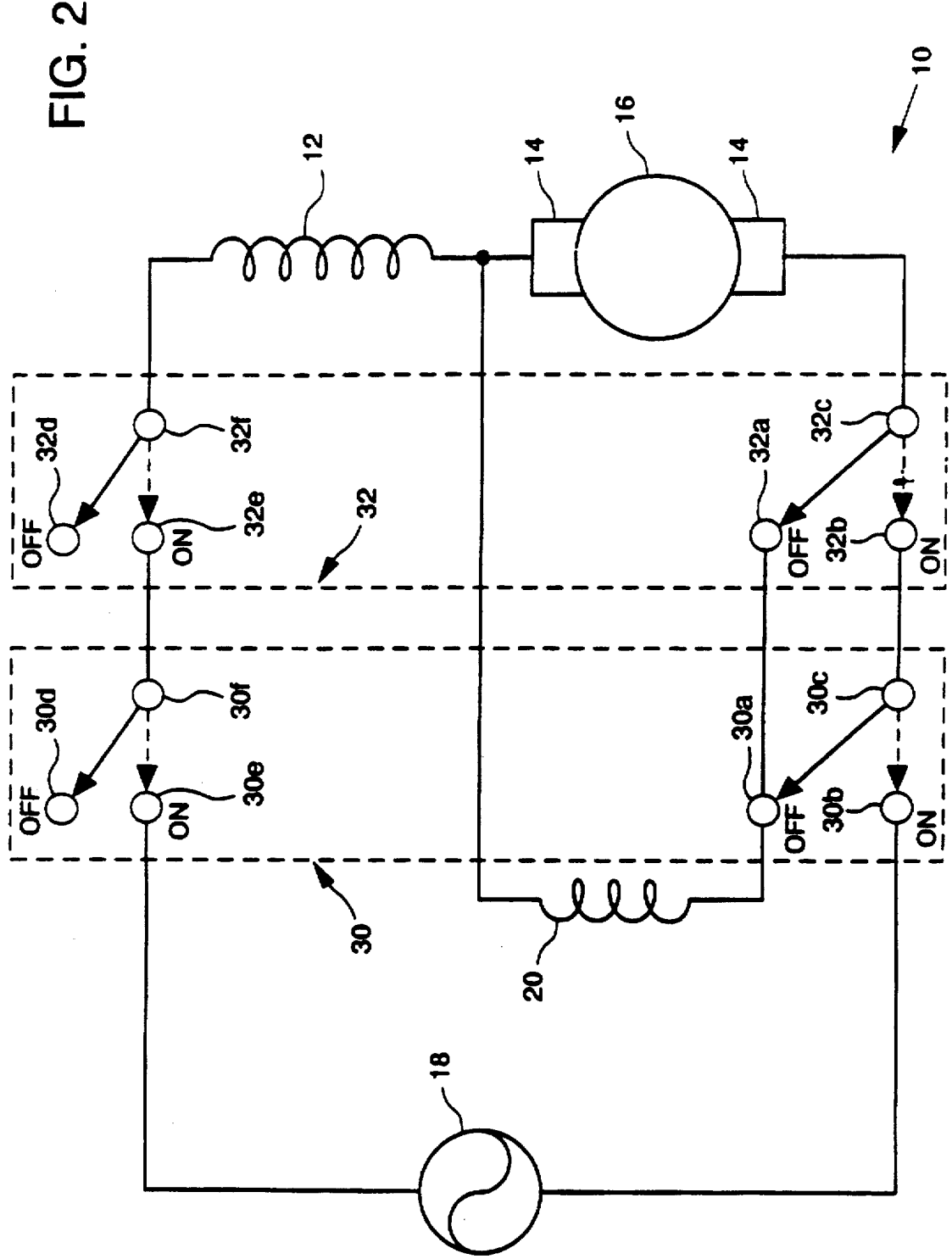
FIG. 2 is a schematic of a second embodiment of the present invention including a series motor with a brake winding and two double-pole, double-throw switches connected to a power source.

Referring now to FIG. 2, there is shown a circuit diagram for a second embodiment of the present invention. The motor and circuit configurations are similar to that described for FIG. 1, with the difference being the switches 30 and 32 are double-pole, double-throw (DPDT) switches. As shown, the first pole is connected and operates identical to the embodiment of FIG. 1. As is known, the poles of the switches 30, 32 act coincidentally or concurrently.

With continuing reference to FIG. 2, the second poles of the switches 30 and 32, however, are electrically connected between the power supply 18 and the field coil 12 with the ON contact 30e tied to the power supply, the COMMON contact 30f tied to the ON contact 32e of switch 32 and the COMMON contact of switch 32 tied to one side of the field coil 12. The OFF contacts 30d, 32d are left unconnected. The functioning of the circuit remains virtually unchanged from that of FIG. 1, with the exception that when either or both of the switches 30 or 32 are actuated to the OFF position as shown in FIG. 2, both sides of the power supply are disconnected from the motor 10.

Figure 3:
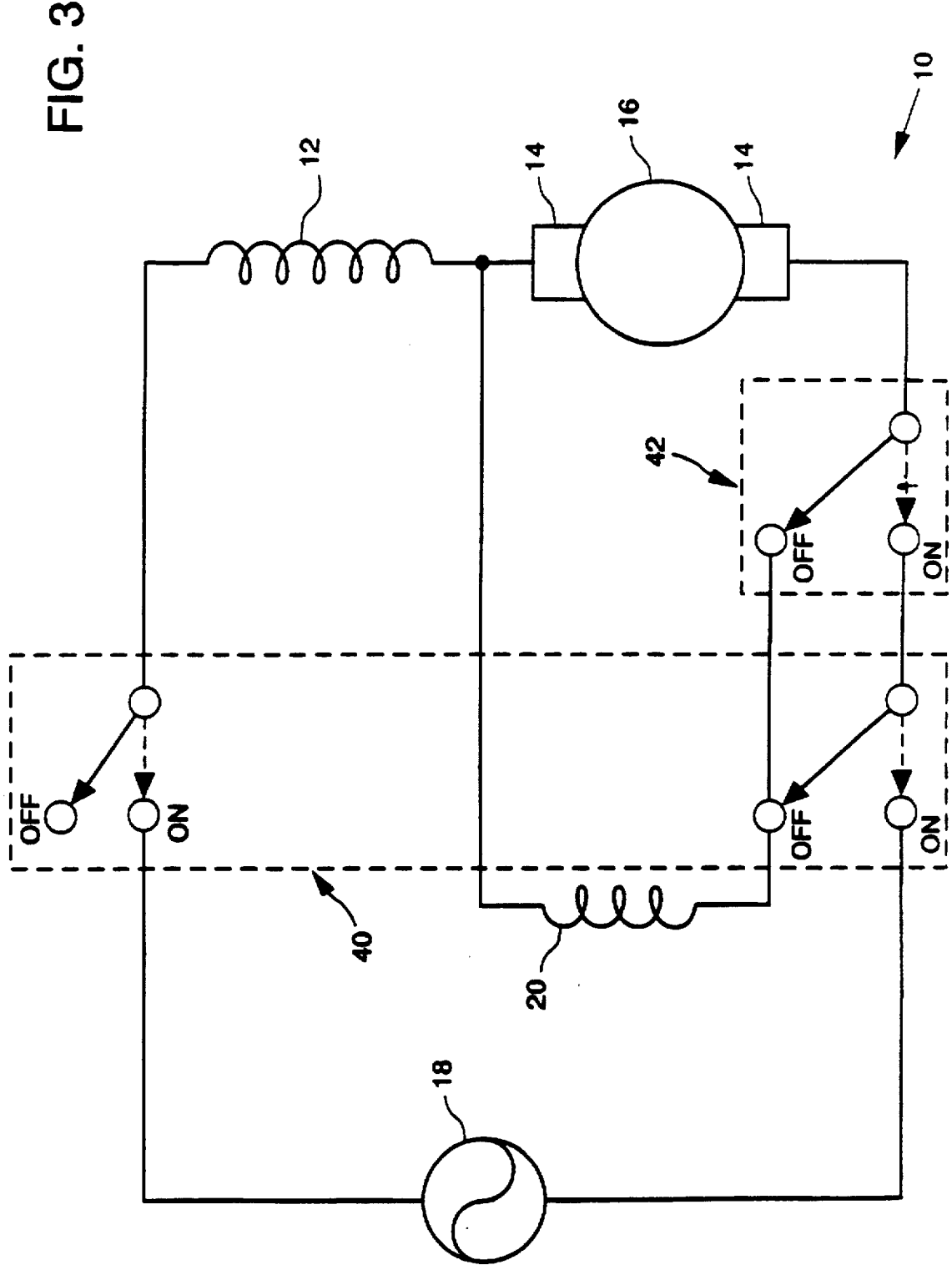
FIG. 3 is a schematic of a third embodiment of the third invention including a series motor with a brake winding, a single-pole, double-throw switch and a double-pole, double-throw switch connected to a power source.

Referring now to FIG. 3, there is shown a circuit diagram for a third embodiment of the present invention. The motor and circuit configurations are similar to that described in FIG. 1, except that one switch 40 is a double-pole, double-throw switch and the second switch 42 is a single-pole, double-throw (SPDT) switch. Of course, switch 40 could be SPDT and switch 42 could be the DPDT switch, without effecting operation of the circuit. The poles of switch 40 are electrically interconnected as described above with reference to switch 30 of FIG. 2, and the switch 42 is electrically interconnected as described above with reference to FIG. 1.

Figure 4:
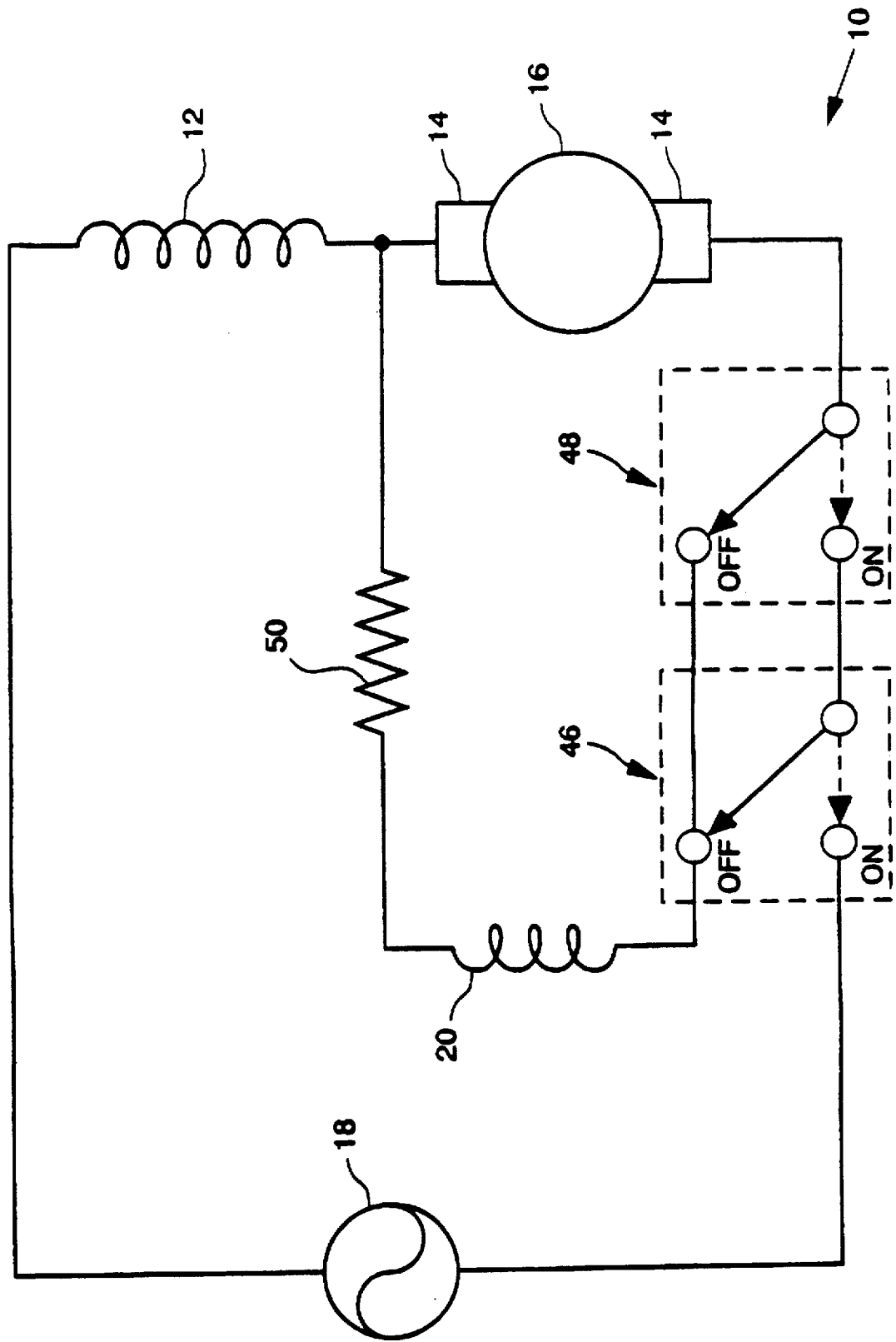
FIG. 4 is a schematic of a fourth embodiment of the present invention including a series motor with a brake winding, a pair of single-pole, double-throw switches and a current limiting resistor.

Referring now to FIG. 4, there is shown a circuit diagram for a fourth embodiment of the present invention. This motor and circuit configuration is substantially similar to that described in FIG. 1, including two SPDT switches 46 and 48, except a resistor 50 is electrically connected in series relation with the brake winding 20 and one of the brushes 14.

With continuing reference to FIG. 4, the resistor 50 functions to limit the current flow in the braking circuit which is operative when either of the switches 46 or 48 is actuated to the OFF position (i.e. when either hand of the operator releases the handle grip). By limiting the current flowing in the braking circuit, the speed of the braking action can be limited. Limiting the severity with which the motor is brakes has the advantage of reducing the destructive forces caused by sudden stopping of the motor 10. Additionally, the use of the braking resistor 50 will reduce the heat generated in the braking coil 20, reducing wearing of the motor commutator and brushes during the braking action. The actual speed of the braking action can thus be varied by selecting the appropriate resistor 50. Of course, the embodiments shown in FIGS. 1–3 may be modified to include the current limiting resistor.

It is to be understood, of course, that while the forms of the invention described above constitute the preferred embodiments of the invention, the preceding description is not intended to illustrate all possible forms thereof. It is also to be understood that the words used are words of description, rather than limitation, and that various changes may be made without departing from the spirit and scope of the invention, which should be construed according to the following claims.

What is claimed is:

1. A motor braking circuit arrangement, for use with a series/universal motor and a power supply for supplying power to the motor, the motor having a stator and an armature for rotating relative to the stator, the circuit arrangement comprising:

a field winding wound about the stator, the field winding electrically connected in series with an armature winding wound about the armature;

a separate brake winding wound about the stator; and two series-connected single-pole switches, each switch capable of assuming a first position associated with normal motor operation and a second position associated with motor braking, the switches being electrically interconnected with the power supply, the armature, and the brake winding such that the motor is energized by the power supply when both switches are in said first position, and such that when either of the switches is in the second position, the motor is electrically disconnected from the power supply and the brake winding is electrically connected in parallel with the armature so as to effect motor braking.

2. A motor braking circuit arrangement, for use with a series/universal motor and a power supply for supplying power to the motor, the motor having a stator and an armature for rotating relative to the stator, the circuit arrangement comprising:

a field winding wound about the stator, the field winding electrically connected in series with an armature winding wound about the armature;

a separate brake winding wound about the stator; and two series-connected switches each having a first pole and second pole which act coincidentally, each pole of each switch capable of assuming a first position associated with normal motor operation and a second position associated with motor braking, the switches being electrically interconnected with the power supply, the field winding, the armature, and the brake winding such that the motor is energized by the power supply when the poles of the switches are in said first position, and such that when both poles of either of the switches are in the second position, the motor is electrically disconnected from the power supply and the brake winding is electrically connected in parallel with the armature so as to effect motor braking.

3. The motor braking circuit arrangement of claim 2 further comprising a resistor electrically connected in series with the separate brake winding, the resistor limiting the current flow through the separate brake winding when the brake winding is electrically connected in parallel with the armature, the resistor functioning to limit the rate of motor braking.

4. A motor braking circuit arrangement, for use with a series/universal motor and a power supply for supplying power to the motor, the motor having a stator and an armature for rotating relative to the stator, the circuit arrangement comprising:

a field winding wound about the stator, the field winding electrically connected in series with an armature winding wound about the armature;

a separate brake winding wound about the stator; and two series-connected switches including a first single-pole switch and a second switch having a first pole and a second pole which act coincidentally, each pole of each switch capable of assuming a first position associated with normal motor operation and a second position associated with motor braking, the switches being electrically interconnected with the power supply, the field winding, the armature, and the brake winding such that the motor is energized by the power supply when the poles of the switches are in said first position, and such that when the poles of either of the switches are in the second position, the motor is electrically disconnected from the power supply and the brake winding is electrically connected in parallel with the armature so as to effect motor braking.

5. The motor braking circuit arrangement of claim 4 further comprising a resistor electrically connected in series with the separate brake winding, the resistor limiting the current flow through the separate brake winding when the brake winding is electrically connected in parallel with the armature, the resistor functioning to limit the rate of motor braking.

6. The motor braking circuit arrangement of claim 4 wherein the switches are electrically interconnected with the power supply, the field winding, the armature, and the brake winding such that when the poles of the second switch are in the second position, the motor is electrically disconnected from the power supply and the brake winding is electrically connected in parallel with the armature so as to effect motor braking.

7. A motor braking circuit arrangement, for use with a series/universal motor and a power supply for supplying power to the motor, the motor having a stator and an armature for rotating relative to the stator, the circuit arrangement comprising:

a field winding wound about the stator, the field winding electrically connected in series with an armature winding wound about the armature;

a series-connected separate brake winding and resistor, the separate brake winding wound about the stator; and two series-connected single-pole switches, each switch capable of assuming a first position associated with normal motor operation and a second position associated with motor braking, the switches being electrically interconnected with the power supply, the armature and the brake winding such that the motor is energized by the power supply when both switches are in said first position, and such that when either of the switches is in the second position, the motor is electrically from the power supply and the brake winding and resistor are electrically connected in parallel with the armature so as to effect motor braking.

* * * * *